United States Patent [19]

Haller

[11] Patent Number: 5,053,187

[45] Date of Patent: Oct. 1, 1991

[54] APPARATUS FOR POSITIONING A MAST FOR THE INSPECTION AND/OR REPAIR OF A CORE SHROUD OF A WATER-COOLED NUCLEAR REACTOR

[75] Inventor: Hans Haller, Mannheim, Fed. Rep. of Germany

[73] Assignee: ABB Reaktor GmbH, Mannheim, Fed. Rep. of Germany

[21] Appl. No.: 584,728

[22] Filed: Sep. 18, 1990

[30] Foreign Application Priority Data

Sep. 18, 1989 [DE] Fed. Rep. of Germany ....... 3931079

[51] Int. Cl.$^5$ ............................................ G21C 17/08
[52] U.S. Cl. .................................. 376/258; 376/248; 33/502
[58] Field of Search ............... 376/258, 248, 245, 260; 33/502

[56] References Cited

U.S. PATENT DOCUMENTS

| | | | |
|---|---|---|---|
| 4,590,671 | 5/1986 | Havoic-Conroy | 376/260 |
| 4,657,728 | 4/1987 | Coppa et al. | 376/248 |
| 4,704,801 | 11/1987 | Frizot et al. | 376/245 |
| 4,717,530 | 1/1988 | Beuqlot | 376/245 |
| 4,756,867 | 7/1988 | Blocquel | 376/248 |
| 4,929,413 | 5/1990 | Kaufmann et al. | 376/248 |

Primary Examiner—Daniel D. Wasil
Assistant Examiner—Frederick H. Voss
Attorney, Agent, or Firm—Herbert L. Lerner; Laurence A. Greenberg

[57] ABSTRACT

Apparatus for positioning a mast for the inspection and/or repair of a core shroud of a water-cooled nuclear reactor, heretofore have had television cameras directed at centering pins and bores from the side. Due to the inclined direction of surveillance, the alignment produced therewith has been inaccurate. In order to achieve a precise positioning, according to the invention a marking element which is provided between the television camera and the support plate has markings which can be brought into alignment with a marking made on the support plate. The centering pins and the bores are disposed concentrically to one another once they have been brought into alignment.

5 Claims, 5 Drawing Sheets

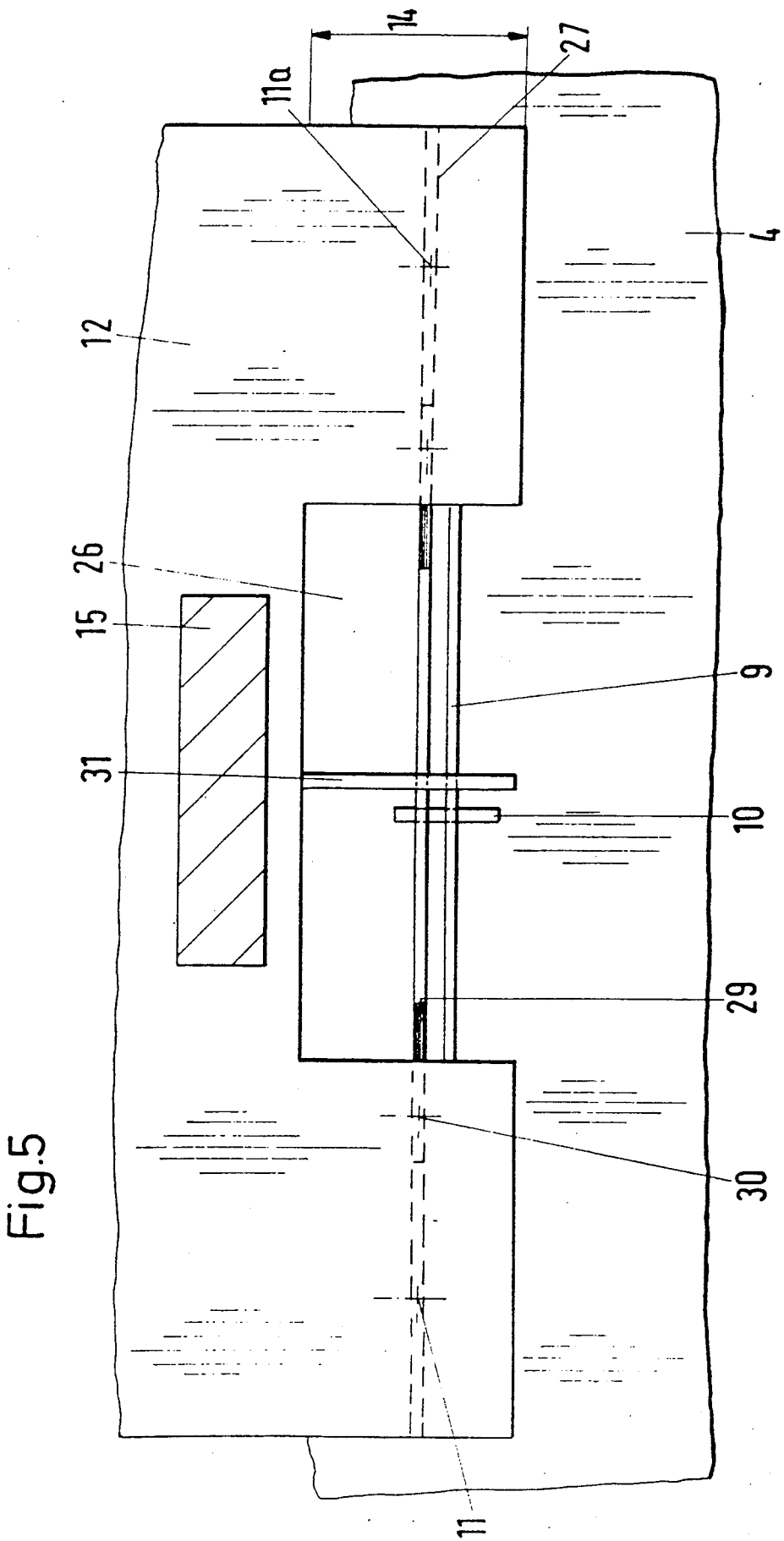

APPARATUS FOR POSITIONING A MAST FOR THE INSPECTION AND/OR REPAIR OF A CORE SHROUD OF A WATER-COOLED NUCLEAR REACTOR

The invention relates to an apparatus for positioning a mast for the inspection and/or repair of a core shroud or barrel of a water-cooled nuclear reactor, the foot of the mast being provided with centering pins which can be introduced, under television camera surveillance, into bores of a support plate disposed at the bottom of the core shroud.

Such a generally known apparatus which is used to carry out the inspection and/or repair of a core shroud is described as part of a core structure on pages 87 to 89 of the Thiemig Pocketbook entitled "Druckwasserreaktoren für Kernkraftwerke" (Pressurized-water Reactors for Nuclear Power Plants), dated February 1974. The core shroud is a sheet metal structure which is matched to the periphery of a composite structure of fuel assemblies and is connected to the core structure by means of screws. During inspection and repair, it is primarily the screws that have to be checked and exchanged if necessary.

In order to perform the positioning of the mast of such an inspection and/or repair apparatus, which is several meters long, under a cover of water, at least two television cameras have heretofore been directed at the centering pins and the bores from the side. It was attempted with the aid of monitors to place the centering pins and the bores concentrically to one another. However, due to the inclined direction of surveillance by the television cameras disposed at the side, the alignment was inaccurate. Therefore, besides taking considerable time, the possibility of centering pins or bores becoming damaged due to their lack of concentricity with one another, could not be ruled out.

It is accordingly an object of the invention to provide an apparatus for positioning a mast for the inspection and/or repair of a core shroud of a water-cooled nuclear reactor, which overcomes the hereinafore-mentioned disadvantages of the heretofore-known devices of this general type and which rules out the possibility of centering pins or bores becoming damaged by precise positioning.

With the foregoing and other objects in view there is provided, in accordance with the invention, in a water-cooled nuclear reactor including a core shroud with a bottom, a support plate disposed at the bottom of the core shroud, a television camera, and a mast for the inspection and/or repair of the core shroud having a foot with centering pins to be introduced into respective bores formed in the support plate under surveillance by the television camera, an apparatus for positioning the mast, comprising a first marking disposed at the support plate, and a marking element associated with the mast and disposed between the television camera and the support plate, the marking element having a second marking to be brought into alignment with the first marking, and the centering pins and the bores being provided with the markings in such a way that the centering pins and the respective bores are disposed concentrically to one another when the markings are in alignment.

The direction of surveillance of the single television camera used in this case is directed perpendicularly to the markings and to the support plate, so that they can be brought precisely into alignment by moving the mast sideways.

In accordance with another feature of the invention, the marking element is a baseplate being connected to the mast and having a region protruding beyond the cross-section of the mast, the baseplate receiving two of the centering pins in a spaced-apart disposition and having a holder disposed on the baseplate for the television camera.

In this way it is ensured that the camera holder and the marking element form a rigidly interconnected component which helps with precise positioning.

In accordance with a further feature of the invention, the protruding region has a recess or clearance formed therein having an axis of symmetry and being symmetrical to the centering pins, the second marking is a thread spanning the recess, and including a cross-piece extending perpendicularly to the thread along the axis of symmetry of the recess and serving as a marking.

Since the thread is extended over a recess or clearance going through the protruding region, both the thread and the marking in the support plate can be picked up by the camera and brought into alignment with the aid of a monitor by moving the mast sideways.

In accordance with an added feature of the invention, an imaginary continuation of the thread passes through the centers of the centering pins.

In accordance with a concomitant feature of the invention, the first marking is a groove being formed in the support plate and having a width corresponding to the thickness of the thread, the support plate has a cross-groove formed therein at a central location between the bores being perpendicular to the groove and having a width corresponding to the width of the cross-piece, the thread and the crosspiece assume a given position with respect to the centering pins, and the groove and the cross-groove assume the given position with respect to the bores.

Consequently, once the thread has been brought completely over the groove and the cross-piece has been brought completely over the cross-groove, a precise positioning is achieved.

Other features which are considered as characteristic for the invention are set forth in the appended claims.

Although the invention is illustrated and described herein as embodied in an apparatus for positioning a mast for the inspection and/or repair of a core shroud of a water-cooled nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 5 is a cross-sectional view taken along the line V-V of FIG. 3, in the direction of the arrows.

Figure 1:
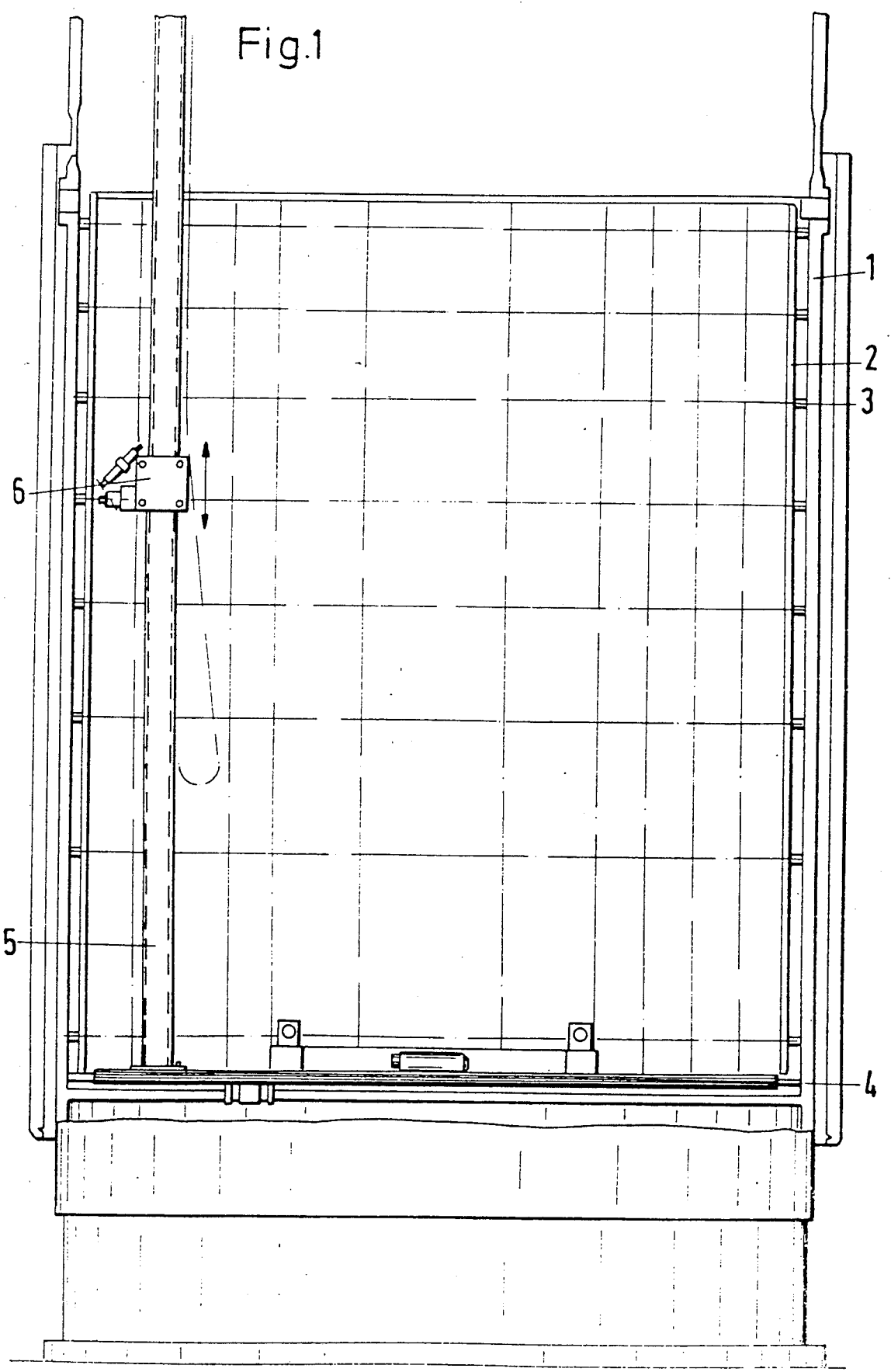
FIG. 1 is a fragmentary, diagrammatic, longitudinal-sectional view of a core shroud or barrel disposed in a core structure, with part of a mast.
Figure 2:
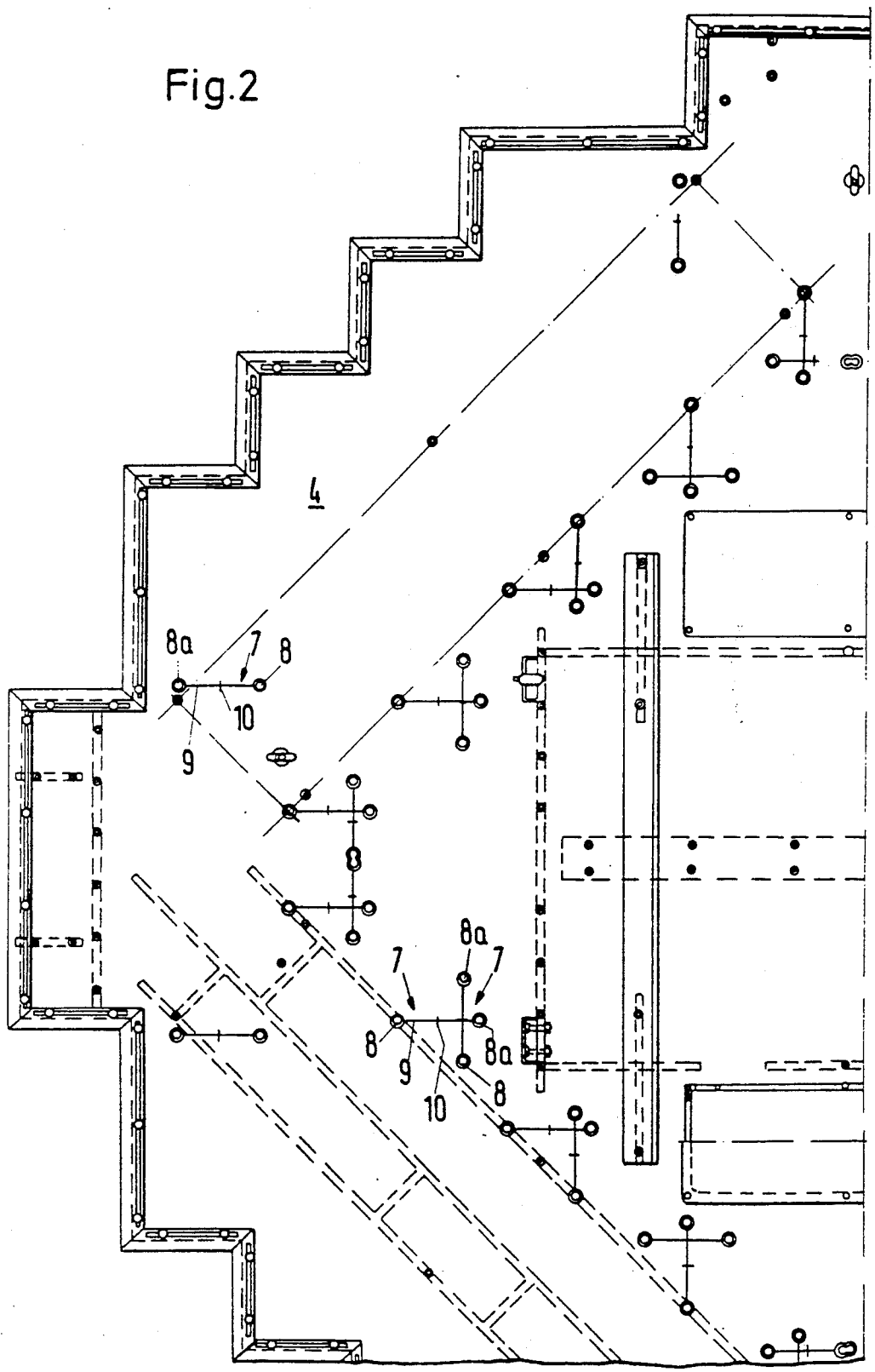
FIG. 2 is an enlarged fragmentary plan view of a support plate.

Referring now to the figures of the drawings in detail and first, particularly, to FIG. 1 thereof, there is seen a partial region of a core structure 1 of a water-cooled nuclear reactor plant. The core structure receives a core shroud or barrel 2, the periphery of which is matched to a composite structure of non-illustrated fuel assemblies. Therefore, as viewed in cross-section, the core shroud has a multiplicity of bent-out portions. In the vicinity of each bent-out portion, the core shroud is fastened by screws 3 to the core structure 1. In order to perform inspection or repair of the screws 3, a support plate 4 is disposed on the bottom of the core structure and a mast 5 is supported thereon. At its non-illustrated top end, the mast may be held by a hoist. An inspection or repair device 6 can move along the mast for the inspection or repair of the screws 3. As can be seen from FIG. 2, which is a plan view of a partial region of the support plate 4, a plurality of pairs 7 of bores are formed therein. Bores 8, 8a of the pairs 7 are each associated with a first marking in the form of groove 9. In this configuration, an imaginary continuation of the groove 9 in each case runs through the centers of the bores 8, 8a. The center-to-center distance of a pair 7 of bores is marked by a cross-groove 10, which runs perpendicularly to the groove 9 and intersects it. In order to reach various inspection positions, centering pins 11, 11a associated with the mast 5 and seen in FIG. 3 have to be inserted into the corresponding pairs of bores 7, which have a spacing corresponding to the spacing between the centering pins.

Figure 3:
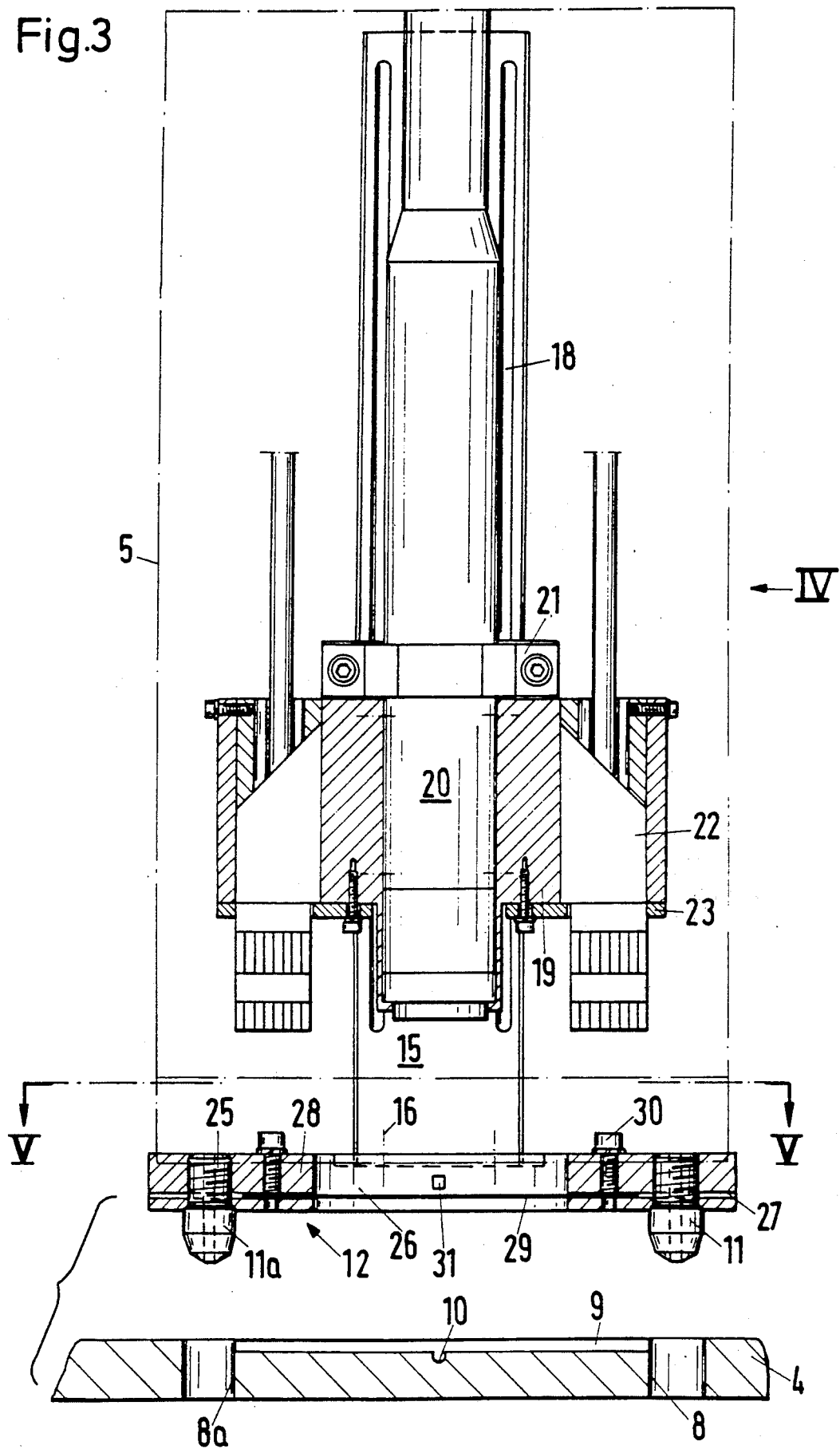
FIG. 3 is a fragmentary, partially sectional, front-elevational view of a baseplate with a camera holder and the support plate.
Figure 4:
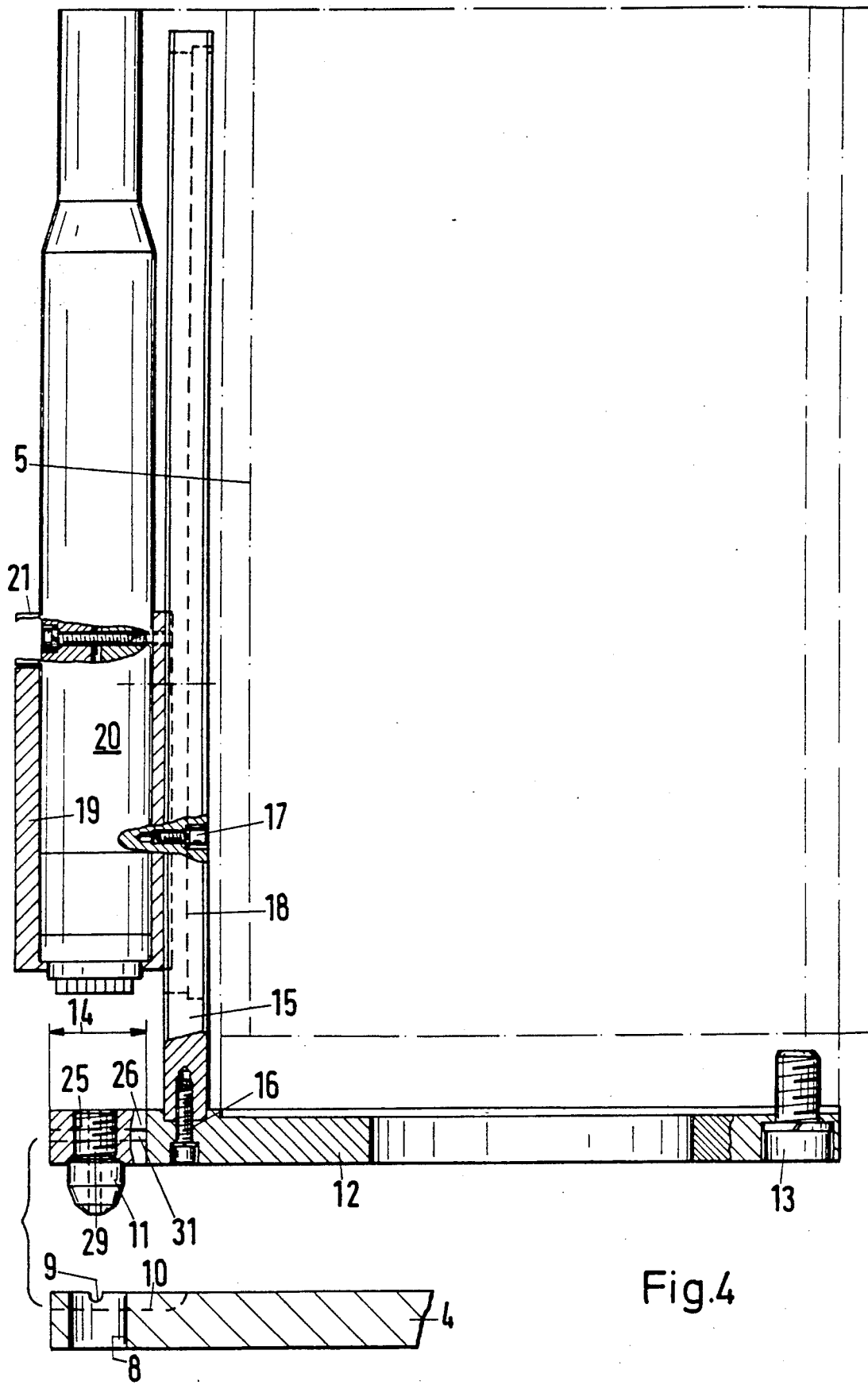
FIG. 4 is a fragmentary, partially sectional and partially broken-away view, seen in the direction of an arrow IV in FIG. 3.

In order to position the mast 5, which is indicated in phantom in FIGS. 3 and 4, a baseplate 12, which serves as a marking element, is fastened on the underside of the mast 5 by means of screws 13. At one bottom edge of the mast, the baseplate 12 protrudes beyond the mast cross section with a region 14 seen in FIGS. 4 and 5. In this region 14, a console 15 which extends parallel to the mast 5 is embedded or let-in and is fastened by a screw connection 16. A television camera 20 is supported in a holder 19 that is fastened by screws 17 in slots 18 formed in the console 15, and the camera is secured by a clamp 21. The holder 19 also receives two lighting fixtures 22, which are secured by means of holding elements 23, 24. The centering pins 11, 11a are screwed into threaded bores 25 in the region 14 of the baseplate 12. In symmetrical configurations of the centering pins 11, 11a, the region 14 has a recess or clearance 26, which reaches, closer to the console 15 than the threaded bore 25. A bore 27 is formed in side walls 28 of the region 14. In this configuration the bore passes diametrically through the centering pins 11, 11a being screwed-in at that location. A second marking, which has been given the form, of a thread 29 or wire, is fitted in the bore 27 in such a way that it spans the recess or clearance 26. The thread or wire is held in the bore 26 by clamping screws 30. In order to mark the center-to-center distance, a cross-piece 31, which crosses over the thread 29, protrudes from the base of the clearance or recess 26.

Once a rough adjustment has been made in order to bring the mast 5 sufficiently far into its position that the television camera picks up not only the thread 29 and the cross-piece 31 but also the groove 9 and the cross-groove 10 of the support plate 4 seen in FIG. 5 on a non-illustrated monitor, the mast 5 is moved sideways by means of a non-illustrated slight adjustment until the thread 29 is brought into line with the groove 9 and the cross-piece 31 is brought into line with the cross-groove 10. The thickness of the thread and the width of the groove correspond in this case, so that the width of the crosspiece and the width of the cross-groove correspond as well. Due to the virtually perpendicular direction of viewing of the single television camera, there is no picture distortion, so that precise positioning through a monitor is possible.

While the positioning shown in FIG. 5 is before the markings are brought into line, according to FIGS. 3 and 4 the centering pins 11, 11a and the bores 8, 8a are already on the same axis, so the mast then only has to be lowered until the baseplate 12 of the mast is set down on the support plate 4.

I claim:

1. In a water-cooled nuclear reactor including a core shroud with a bottom, a support plate disposed at the bottom of the core shroud, a television camera, and a mast for the inspection and/or repair of the core shroud having a foot with centering pins to be introduced into respective bores formed in the support plate under surveillance by the television camera, an apparatus for positioning the mast, comprising a first marking disposed at the support plate, and a marking element associated with the mast and disposed between the television camera and the support plate, said marking element having a second marking to be brought into alignment with said first marking, and the centering pins and the respective bores being disposed concentrically to one another when said markings are in alignment.

2. Apparatus according to claim 1, wherein said marking element is a baseplate being connected to the mast and having a region protruding beyond the cross-section of the mast, said baseplate receiving two of the centering pins in a spaced-apart disposition, and including a holder disposed on said baseplate for the television camera.

3. Apparatus according to claim 2, wherein said protruding region has a recess formed therein having an axis of symmetry and being symmetrical to the centering pins, said second marking is a thread spanning said recess, and including a cross-piece extending perpendicularly to said thread along the axis of symmetry of said recess and serving as a marking.

4. Apparatus according to claim 3, wherein an imaginary continuation of said thread intersects, centers of the centering pins.

5. Apparatus according to claim 3, wherein said first marking is a groove being formed in the support plate and having a width corresponding to the thickness of said thread, the support plate has a cross-groove formed therein at a central location between the bores being perpendicular to said groove and having a width corresponding to the width of said cross-piece, said thread and said crosspiece assume a given position with respect to the centering pins, and said groove and said cross-groove assume said given position with respect to the bores.

* * * * *